United States Patent
Levy

(10) Patent No.: US 11,079,049 B2
(45) Date of Patent: Aug. 3, 2021

(54) CONNECTOR WITH APPARATUS FOR RELIEVING TORSIONAL STRAIN ON SEALING ELEMENTS

(71) Applicant: PETROTECHNOLOGIES, INC., Broussard, LA (US)

(72) Inventor: David Levy, Broussard, LA (US)

(73) Assignee: PETROTECHNOLOGIES, INC., Broussard, LA (US)

( * ) Notice: Subject to any disclaimer, the term of this patent is extended or adjusted under 35 U.S.C. 154(b) by 0 days.

(21) Appl. No.: 16/563,219

(22) Filed: Sep. 6, 2019

(65) Prior Publication Data

US 2020/0049289 A1   Feb. 13, 2020

Related U.S. Application Data

(63) Continuation-in-part of application No. 16/101,067, filed on Aug. 10, 2018.

(51) Int. Cl.
  *F16L 33/22* (2006.01)
  *F16L 15/00* (2006.01)
  *F16L 21/06* (2006.01)

(52) U.S. Cl.
  CPC ........... *F16L 33/223* (2013.01); *F16L 15/007* (2013.01); *F16L 21/065* (2013.01); *F16L 33/225* (2013.01)

(58) Field of Classification Search
  CPC ....... F16L 19/06; F16L 19/045; F16L 19/061; F16L 19/065; F16L 19/07; F16L 19/075; F16L 19/08; F16L 19/10; F16L 19/103; F16L 19/12
  USPC ................ 285/341, 342, 343, 354, 386, 389
  See application file for complete search history.

(56) References Cited

U.S. PATENT DOCUMENTS

| | | | | |
|---|---|---|---|---|
| 833,784 A | * | 10/1906 | Hicks | F16L 19/065 277/622 |
| 1,790,025 A | * | 1/1931 | Schnaier | F16L 19/045 285/334.5 |
| 2,162,184 A | * | 6/1939 | Snyder | F16L 19/075 285/353 |
| 2,219,053 A | * | 10/1940 | Osborn | F16L 19/00 285/343 |
| 2,310,744 A | * | 2/1943 | Osborn | F16L 19/06 285/343 |
| 2,328,469 A | * | 8/1943 | Laffly | F16L 19/045 285/334.2 |
| 2,333,909 A | * | 11/1943 | Williams | F16L 19/045 285/332.4 |
| 2,412,664 A | * | 12/1946 | Wolfram | F16L 19/083 285/343 |
| 3,294,426 A | * | 12/1966 | Lyon | F16L 19/041 285/334.5 |
| 3,432,187 A | * | 3/1969 | Dutton | F16L 49/06 285/55 |
| 3,653,688 A | * | 4/1972 | Sakakibara | F16L 21/022 285/105 |

(Continued)

*Primary Examiner* — Aaron M Dunwoody
(74) *Attorney, Agent, or Firm* — Rao DeBoer Osterrieder, PLLC; Dileep P. Rao

(57) ABSTRACT

A connector which relieves a sealing element of torsional strain having a first threaded engagement, optionally, a second threaded engagement, a void therethrough for receiving a tube, and a sleeve positioned between each threaded engagement and the void. The sleeve relieves the tube of torsional strain from rotating the connector.

7 Claims, 3 Drawing Sheets

(56) References Cited

U.S. PATENT DOCUMENTS

| | | | | | |
|---|---|---|---|---|---|
| 3,986,730 | A | * | 10/1976 | Martelli | F16L 19/075 285/23 |
| 4,223,919 | A | * | 9/1980 | Kurachi | F16L 19/065 285/248 |
| 4,606,564 | A | * | 8/1986 | Karachi | F16L 19/065 285/244 |
| 5,401,065 | A | * | 3/1995 | Okumura | F16L 19/06 285/328 |
| 6,241,022 | B1 | * | 6/2001 | Mailand | E21B 17/025 166/242.6 |
| 7,219,736 | B1 | * | 5/2007 | Levy | E21B 47/117 166/336 |
| 7,300,076 | B2 | * | 11/2007 | Inoue | F16L 33/222 285/248 |
| 8,037,933 | B1 | * | 10/2011 | Levy | E21B 17/025 166/242.3 |
| 8,650,934 | B1 | * | 2/2014 | Levy | G01M 3/2853 73/40.5 R |
| 2010/0059996 | A1 | * | 3/2010 | Ciprich | F16L 19/10 285/342 |
| 2014/0151998 | A1 | * | 6/2014 | Jahn | F16L 19/07 285/93 |
| 2018/0202586 | A1 | * | 7/2018 | Larson | F16L 25/14 |
| 2020/0049289 | A1 | * | 2/2020 | Levy | F16L 21/065 |

\* cited by examiner

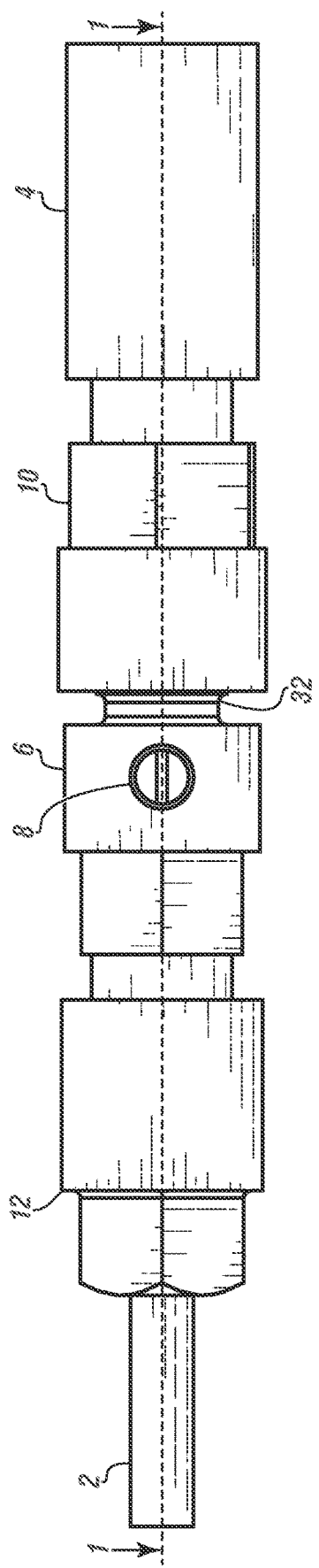
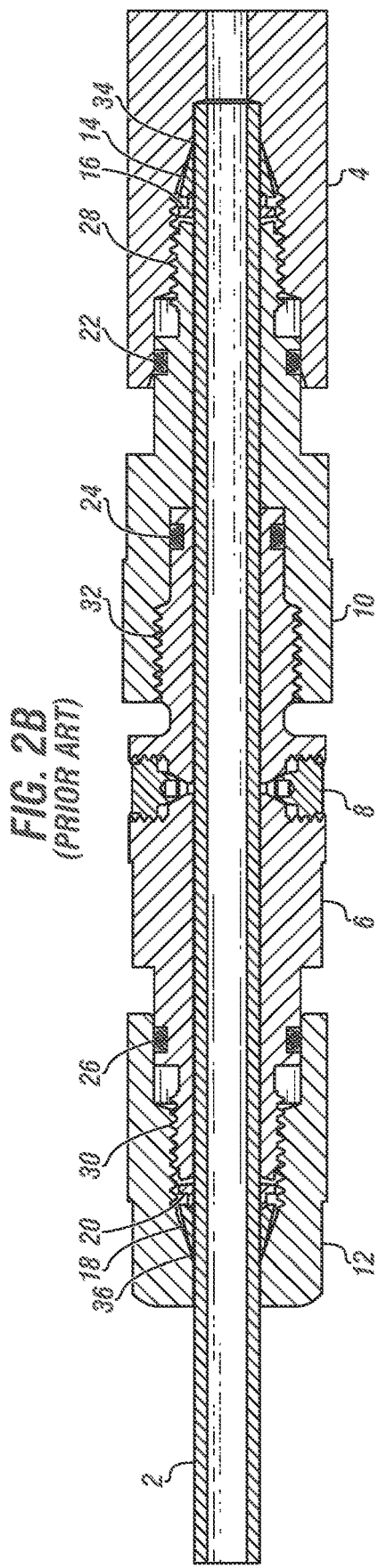
FIG. 2A (PRIOR ART)
FIG. 2B (PRIOR ART)

CONNECTOR WITH APPARATUS FOR RELIEVING TORSIONAL STRAIN ON SEALING ELEMENTS

CROSS REFERENCE TO RELATED APPLICATION

The current application is a Continuation in Part and claims priority to and the benefit of co-pending U.S. Non-provisional patent application Ser. No. 16/101,067 filed on Aug. 10, 2018, titled "PRESSURE BALANCING MECHANISM FOR A CONNECTOR". This reference is incorporated in its entirety herein.

FIELD

The present embodiments relate to a connector which relieves a sealing element of torsional strain.

BACKGROUND

Often connectors are used for sections of tube used for fluid flow. These connectors can make use of seals to prevent fluid leakage.

Torsion of connector parts to tighten engagement can result in shear stresses applied to seals, thereby reducing their effectiveness, increasing failure modes, and potentially requiring costly repairs or replacements for many applications.

Therefore, a need exists for a mechanism which can allow a connector to be used to connect to a seal without applying torsional strain to sealing elements.

The present embodiments meet this need.

BRIEF DESCRIPTION OF THE DRAWINGS

The detailed description will be better understood in conjunction with the accompanying drawings as follows:

FIG. 2A depicts a side view of the prior art high pressure energizable connector of FIG. 1.

FIG. 2B depicts a cross-sectional view of the prior art high pressure energizable connector of FIG. 2A along line 1-1.

Figure 1:
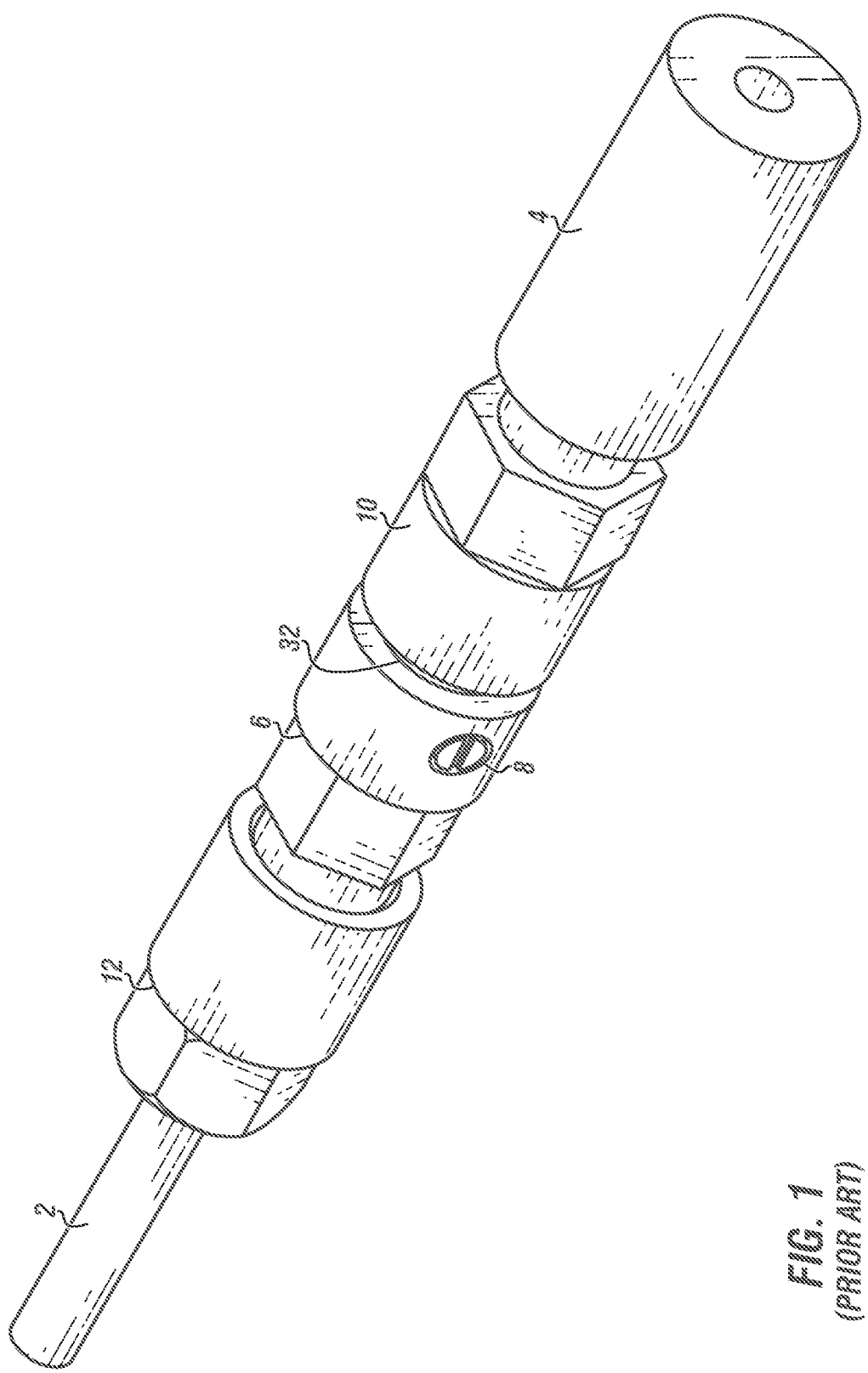
FIG. 1 depicts a perspective view of an embodiment of a prior art high pressure energizable connector.

The present embodiments are detailed below with reference to the listed Figures.

DETAILED DESCRIPTION OF THE EMBODIMENTS

Before explaining the present disclosure in detail, it is to be understood that the disclosure is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only and are not intended to be limiting.

Specific structural and functional details disclosed herein are not to be interpreted as limiting, but merely as a basis of the claims and as a representative basis for teaching persons having ordinary skill in the art to variously employ the present embodiments. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The word "about" means plus or minus 5% of the stated number.

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

When methods are disclosed or discussed, the order of the steps is not intended to be limiting, but merely exemplary unless otherwise stated.

Accordingly, the scope of protection is not limited by the description herein, but is only limited by the claims which follow, encompassing all equivalents of the subject matter of the claims. Each and every claim is hereby incorporated into the specification as an embodiment of the present disclosure. Thus, the claims are a further description and are an addition to the embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

The present embodiments relate to a connector which relieves a sealing element of torsional strain.

Connector can refer to a nipple, a compression collar, a tension collar, or any other structure which encloses at least a portion of a tube. The connector is attached to another element which encloses at least a portion of a tube.

The connector for a tube can have a first threaded engagement, optionally, a second threaded engagement, a void therethrough for receiving a tube, and a sleeve positioned between each threaded engagement and the void.

Rotating the connector tightens both the first threaded engagement and the second threaded engagement (if used) without applying torsional force to the tube situated within the void.

The first threaded engagement can be in mechanical communication with a first sealing element and the second threaded engagement (if used) can be in mechanical communication with a second sealing element.

In embodiments, the first threaded engagement is oppositely threaded from the second threaded engagement, allowing for rotation of the connector to tighten both engagements. The tightening both engagements here refers to the connector moving axially toward another component in the direction of the tube.

In embodiments, rotating the connector axially moves the connector toward the first threaded engagement and deforms the first sealing element without applying a torsional strain to the first sealing element because no torsional strain is applied to the tube.

Similarly, rotating the connector axially can deform the second sealing element without applying a torsional strain to the second sealing element.

By eliminating the torsional strain on sealing elements, a tighter seal is formed as no axial compression is lost to torsional movement of the seal, and galling of the seal on the tube, or weakening of the seal material due to torsion is prevented.

The present disclosure also provides a method of creating a seal in a connector without torsional strain applied to the seal, wherein the method comprises the steps of: sliding a connector on to a tube adjacent a first element having a threaded engagement, providing a sleeve within the connector adjacent the tube, wherein the sleeve prevents torsional force being applied to the tube, providing a first deformable seal between the connector and the first element, and rotating the connector, causing the connector and first element to move toward one another and apply axial force to the first deformable seal, thereby deforming the first deformable seal.

Similarly, the method can comprise: sliding a connector on to a tube between a first element having a first threaded engagement and a second element having a second threaded engagement, providing a sleeve within the connector adjacent the tube, wherein the sleeve prevents torsional force being applied to the tube, providing a first deformable seal between the connector and the first element; and rotating the connector, causing the connector and first element to move toward one another and apply axial force to the first deformable seal, thereby deforming the first deformable seal without applying a torsional force.

In embodiments, the method can comprise the steps of providing a second deformable seal between the connector and the second element, and rotating the connector, causing the connector and second element to move toward one another and apply axial force to the second deformable seal, thereby deforming the second deformable seal without applying a torsional force.

Referring now to the Figures, FIG. 1 is a perspective view of an embodiment of a prior art high pressure energizable connector. The present disclosure can be coupled with any sealed component (i.e. a connector such as this) to relieve shear strain on the seals.

Tube 2 is shown inserted into an inverted jam nut 12. Inverted jam nut 12 can be any kind of nut or connector able to be disposed about the tube 2 and threadably engaged to adjacent connectors.

Inverted jam nut 12 is shown threadably engaged to a first nipple 6. First nipple 6 can have a test port 8 disposed therein. A second nipple 10 can be adjustably and threadably engaged with first nipple 6, forming an adjustable threaded engagement 32. Second nipple 10 is depicted threadably engaged with a female profile 4.

FIG. 2A is a side view of a prior art high pressure energizable connector.

Tube 2 is shown inserted into the inverted jam nut 12. Inverted jam nut 12 is threadably engaged with the first nipple 6 having a test port 8. First nipple 6 is adjustably and threadably engaged with the second nipple 10, forming an adjustable threaded engagement 32. Second nipple 10 is threadably engaged with the female profile 4.

FIG. 2B depicts a cross section of the prior art high pressure energizable connector of FIG. 2A along line 1-1.

Tube 2 is depicted inserted into the inverted jam nut 12. Inverted jam nut 12 is shown threadably engaged with the first nipple 6, forming a second threaded engagement 30. First nipple 6 can have a test port 8.

A second front ferrule 18 and a second rear ferrule 20 are disposed around the tube 2 between the inverted jam nut 12 and the first nipple 6. A secondary seal 36 is formed by compressing the second rear ferrule 20 and the second front ferrule 18 into the inverted jam nut 12 and the tube 2 using a pressure applied through a test port 8.

First nipple 6 is also shown having a third seal 26, which can be an O-ring or a similar kind of seal, disposed between the first nipple 6 and the inverted jam nut 12.

First nipple 6 is depicted adjustably and threadably engaged with the second nipple 10, forming an adjustable threaded engagement 32. It is contemplated that the adjustable threaded engagement 32 can be tightened or loosened as needed to compensate for slack in the tube 2 after applying a pressure through the test port 8.

First nipple 6 is shown having a second seal 24, which can be an O-ring or similar kind of seal, disposed between the first nipple 6 and the second nipple 10. Second nipple 10 is shown having a first seal 22, which can also be an O-ring or a similar kind of seal, disposed between the second nipple 10 and a female profile 4.

Female profile 4 is shown disposed about the tube 2 and threadably engaged with the second nipple 10, forming a first threaded engagement 28. A first front ferrule 14 and a first rear ferrule 16 are disposed around the tube 2 between the second nipple 10 and the female profile 4. A primary seal 34 is formed by compressing the first rear ferrule 16 and the first front ferrule 14 into the female profile 4 and the tube 2 using a pressure applied through test port 8.

As can be seen from both prior art designs, the seals formed by the ferrules will be subject to shear stress based upon torsion of first nipple 6. Torsion of first nipple 6 will result in torsion of tube 2, which in turn will translate to torsional shear on the ferrules.

Figure 3A:
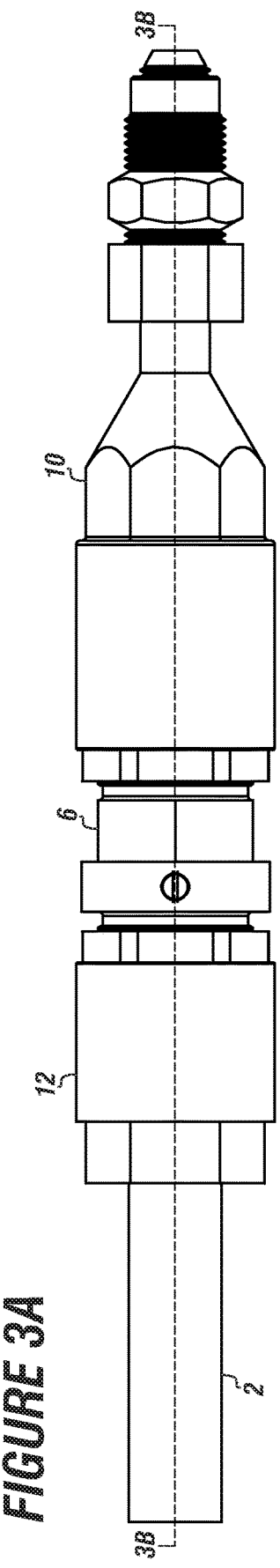
FIG. 3A depicts a side view of an embodiment of a connector.
Figure 3B:
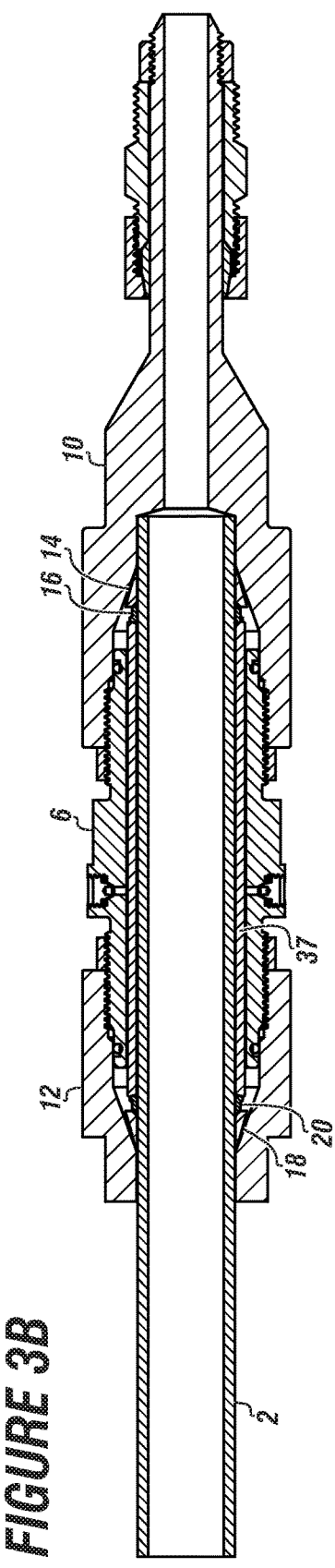
FIG. 3B depicts a cross-sectional view of an embodiment of the connector.

The device of the present disclosure, shown in FIG. 3A and FIG. 3B allows for seals that need not be subject to the full shear stresses of tightening the connector to be utilized. When the connector is subject to torsional strain, the tube is protected by the device and method of the present disclosure to reduce or eliminate such stress on the seals.

FIG. 3A depicts a side view of an embodiment of the connector.

FIG. 3B depicts a cross-sectional view of an embodiment of the connector.

Shown in FIGS. 3A and 3B are tube 2 inserted into inverted jam nut 12 having ferrules 18 and 20. Inverted jam nut 12 is shown threadably engaged with the first nipple 6, which is acting as a connector between inverted jam nut 12 and second nipple 10 having ferrules 16 and 14. Sleeve 37 is shown adjacent tube 2 and first nipple 6 extending past the threaded engagements, thereby protecting tube 2 from torsional strain caused by rotation of first nipple 6.

While the present disclosure emphasizes the presented embodiments and Figures, it should be understood that within the scope of the appended claims, the disclosure might be embodied other than as specifically described herein.

What is claimed is:

1. A connector for a tube comprising:
   a first threaded engagement, wherein the first threaded engagement is in mechanical communication with a first sealing element;
   a void therethrough for receiving a tube;
   a sleeve positioned between the first threaded engagement and the void; and
   a second threaded engagement and a second sleeve positioned between the second threaded engagement and the void;
   wherein rotating the connector tightens the first threaded engagement and the second threaded engagement without applying torsional force to the tube and rotating the connector deforms the first sealing element without applying a torsional strain to the first sealing element.

2. The connector of claim 1, wherein the second threaded engagement is in mechanical communication with a second sealing element.

3. The connector of claim 2, wherein rotating the connector axially deforms the second sealing element without applying a torsional strain to the second sealing element.

4. The connector of claim 1, wherein the first threaded engagement is oppositely threaded from the second threaded engagement.

5. The connector of claim 4, wherein rotating the connector axially deforms the first sealing element without applying a torsional strain to the first sealing element and axially deforms the second sealing element without applying a torsional strain to the second sealing element.

6. The connector of claim 1, wherein the first threaded engagement is in mechanical communication with the first sealing element and the second threaded engagement is in mechanical communication with a second sealing element.

7. A method of creating a seal in a connector without torsional strain applied to the seal, wherein the method comprises the steps of:
   a. sliding a connector on to a tube between a first element having a first threaded engagement and a second element having a second threaded engagement;
   b. providing a sleeve within the connector adjacent the tube, wherein the sleeve prevents torsional force being applied to the tube;
   c. providing a first deformable seal between the connector and the first element;
   providing a second deformable seal between the connector and the second element;
   d. rotating the connector, causing the connector and the first element to move toward one another and apply axial force to the first deformable seal, thereby deforming the first deformable seal without applying a torsional force; and
   rotating the connector, causing the connector and the second element to move toward one another and apply axial force to the second deformable seal, thereby deforming the second deformable seal without applying a torsional force.

* * * * *